United States Patent [19]

Gutzmer

[11] Patent Number: 4,907,267
[45] Date of Patent: Mar. 6, 1990

[54] MODEM INTERFACE DEVICE

[76] Inventor: Howard A. Gutzmer, 4335 Grace Rd., Bonita, Calif. 92002

[21] Appl. No.: 207,208

[22] Filed: Jun. 16, 1988

[51] Int. Cl.[4] .................... H04M 1/70; H04M 11/00; H04L 5/00
[52] U.S. Cl. .................................... 379/442; 379/93; 379/100
[58] Field of Search ................. 379/93, 94, 95, 97, 379/98, 100, 106, 442, 443

[56] References Cited

U.S. PATENT DOCUMENTS

| 4,160,122 | 7/1979 | Jacobson | 379/442 |
| 4,367,374 | 1/1983 | Serrano | 379/93 |
| 4,446,335 | 5/1984 | Lee et al. | 379/443 |

OTHER PUBLICATIONS

Precision Components, Inc.'s advertisement for Data Switch in Teleconnect Magazine, May, 1988.
TVMP, Inc.'s advertisement for Phoneflex in PC Week Magazine, Jun., 1988.
A-JEM's data sheet, Jan., 1988.
K. D. Witt, "Switchbox for Voice/Data Communication", *IBM Technical Disclosure Bulletin*, vol 14, No. 5, Oct. 1971, pp. 1606, 1607.
"WIO Receiver Amplifier", Walker Equipment Corp., Telephony, Sep. 8, 1986, p. 65.

Primary Examiner—Jin F. Ng
Assistant Examiner—Wing F. Chan
Attorney, Agent, or Firm—Brown, Martin, Haller & McClain

[57] ABSTRACT

An apparatus for connecting a telecommunications device, such as a computer or facsimile machine modem, to a telephone line via a telephone set. The telephone set includes a base and a handset connected to the base by a handset cord. The handset cord has at one end a handset plug and the base has a base jack for receiving the handset plug. The apparatus selectively electrically couples one of the handset and the telecommunications device to the base. The apparatus includes a first plug for electrically coupling with the base jack, a first jack for electrically coupling with the handset plug, and the second jack for electrically coupling with the telecommunications device connecting plug. A switch, manually selectable between a first position and a second position, electrically couples the first plug with the first jack when in the first position. A converter is coupled to the switch and the second jack such that when the switch second position is selected, the switch electrically interfacing the first plug with the second jack.

26 Claims, 3 Drawing Sheets

MODEM INTERFACE DEVICE

BACKGROUND OF THE INVENTION

I. Field of the Invention

The present invention relates to telecommunication systems. More specifically, the present invention relates to a novel and improved apparatus for selectively coupling one of a telecommunications device, such as a modem, or a telephone handset to a telephone system via the telephone base handset interconnection jack.

II. Description of Related Art

Modems are commonly used to permit a computer or facsimile machine to communicate with another like device over the telephone line. Conventional modems use a two-wire communications connection that is typically connected directly to a two-wire telephone line.

In many applications it is not possible to utilize a dedicated telephone line for interconnection with the modem. In telephone systems using a PBX arrangement, where many lines are serviced by a central controller, it is difficult to achieve dedicated line service for modem communications. In the PBX arrangement, various lines are required for voice communication. The providing of dedicated telephone lines for modems which are not constantly communicating over the dedicated lines, may result in additional telephone lines that are not used to their full capacity. This system deficiency is especially true when additional voice communication lines are in use and more are needed, although the dedicated modem lines are currently not used. Furthermore, the telephone base usually needs to be coupled to the PBX system to accomplish line selection for outgoing communications.

In the conventional telephone set environment, the user may desire to have both voice and data communication capabilities over the telephone line. The coupling of a modem to the telephone line forms a dedicated line solely for use by the modem, unless the modem includes provisions to couple to the telephone set thereto with a switch for selecting between telephone set or modem interconnection to the telephone line. Otherwise, the modem must be disconnected and the telephone set reconnected to the telephone line. In the latter situation, one must physically interconnect one or the other of the telephone or modem to achieve the selected communication status. In many situations, coupling of the modem to the telephone line may be physically difficult, or impossible, without damaging the existing telephone set-telephone line interconnection. For example, many businesses and hotels have the telephone sets that are hard-wired directly to a corresponding telephone line rather than having a modular plug and jack interconnection. Without the availability of a modular jack in which the telephone set normally plugs into for interconnection to the telephone line, the modem is rendered useless.

The present invention successfully overcomes the difficulties realized in using both modem and voice communications from a single telephone line or through a PBX system. The present invention is a unique apparatus for enabling communications through the telephone set over a single telephone line both voice and data communications.

SUMMARY OF THE INVENTION

The present invention is a novel and improved device for connecting a computer or facsimile machine modem to a telephone line via a telephone set so as to both enable data or voice communications. In the typical telephone set, a telephone base is coupled to the two-wire telephone line. The base typically includes the dialing and ringer hardware. The telephone set also includes a handset which is coupled via a handset cord to the telephone base. The handset cord typically has a modular plug at one end thereof which mates with a handset interconnect jack mounted in the telephone base. The telephone base typically converts the two-wire telephone line connection to a four-wire connection at the handset interconnect jack. The wiring between the base and handset typically include a pair of microphone lines and a pair of speaker lines which respectively couple the base hardware to a microphone and speaker mounted in the handset.

A modem typically has a single pair of communications lines that are readily adaptable for direct coupling to the telephone line via a conventional RJ-11 modular plug. However, for the reasons discussed previously, the telephone base is typically coupled directly to the telephone line or a PBX system. With the telephone base coupled directly to the line, one using the present invention need not inconveniently couple and decouple the telephone set when data communications via the modem are required.

In a PBX system, one needs outgoing line selection capability from the telephone base prior to engaging in outgoing data communication. Decoupling of the telephone base from the line may disrupt the controller such that line selection and the dial tone is lost. The present invention permits coupling of the modem through the telephone base to the telephone line so as to overcome problems associated with using a modem in the PBX environment.

In one embodiment of the present invention a module is connected between the telephone base and, the modem and telephone handset, so as to provide manually selective control between data and voice communications. The selected communication, i.e. data or voice, is provided through the module to the telephone base and telephone line.

The modem, a two-wire device, is coupled along with the telephone handset, a four-wire device, into the module. The module provides a four-wire output to the telephone base handset interconnect jack. The module of the present invention interfaces both the modem and handset to the telephone base along with providing manually selective control between voice and data communications. When the module is placed in the data communication mode, the module functions for interfacing between the two-wire modem communications lines and the four-wire telephone base/handset communications lines. When the module is in the voice mode, the four-wire handset lines are directly coupled to the telephone base/handset communications lines.

In another exemplary embodiment, the present invention comprises an apparatus for connecting a modem, having a connecting plug, to a telephone set having a base and a handset connected to the base by a handset cord. In the telephone set, the handset cord is connected at one end to the handset and has at the other end a handset plug. The base has a handset jack for receiving the handset plug. The module is interconnected between the base, handset and modem for selectively electrically coupling one of the handset and modem to the base. The module includes a first plug for fitting into the base handset jack, and first and second jacks for respectively receiving the handset plug and the connecting plug and for selective electrical coupling to the handset jack. A switch is provided for manual selection between a voice position and a data position so as to respectively electrically couple the first plug with the first jack when in the voice position and electrically couple the first plug with the second jack when in the data position. A converter is disposed between the switch and the second jack for electrically interfacing the first plug with the second jack.

In summary, a device constructed according to the teachings of the present invention converts a telephone base handset jack into a telephone line connection. Accordingly, the device of the present invention permits the coupling of any telephone line compatible device, i.e. modem, facsimile machines, speaker phones, etc.

It is, therefore, an object of the present invention to provide a novel and improved apparatus for selectively interconnecting one of telephone handset and a modem to a telephone line via a telephone base connection.

BRIEF DESCRIPTION OF THE DRAWINGS

These and other features, objects, and advantages of the present invention will become more fully apparent from the detailed description set forth below when taken in conjunction with the drawings in which like reference characters identify correspondingly throughout and wherein.

DETAILED DESCRIPTION OF THE PREFERRED EMBODIMENTS

Figure 1:
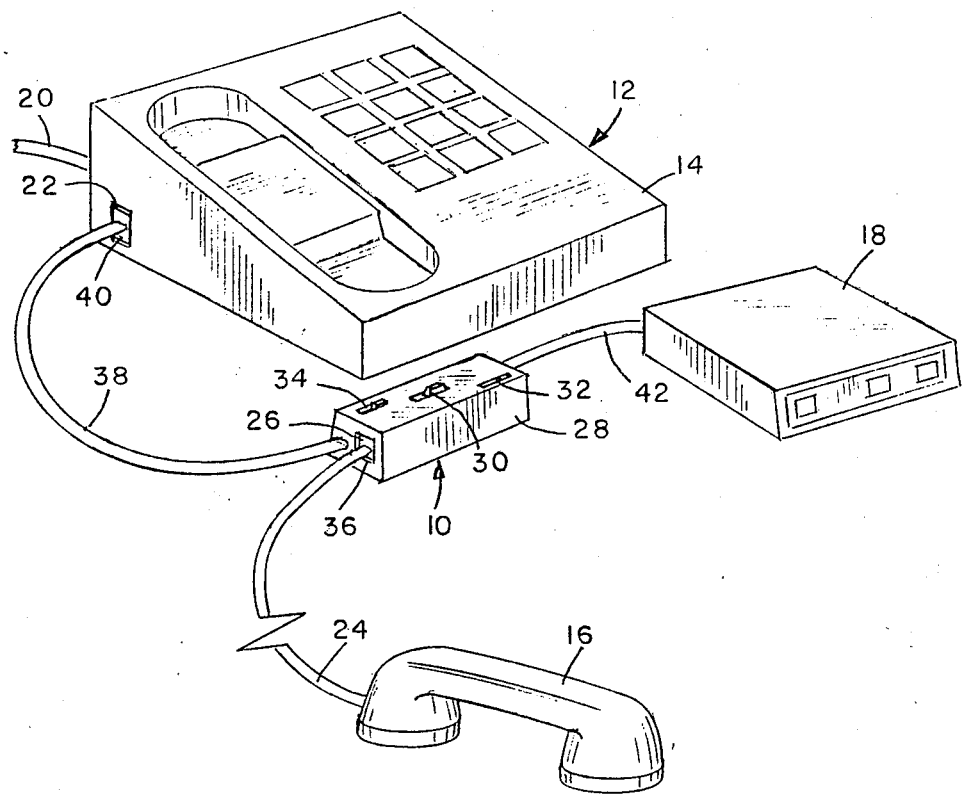
FIG. 1 is a perspective view of a telephone set and a module constructed in accordance with the present invention with the module connected to the telephone base and a computer modem and telephone handset connected to the module.

Turning now to the drawings, FIG. 1 illustrates the arrangement of modem interconnect module 10 of the present invention in relation to telephone set 12. Telephone set 12 includes base 14 and handset 16. Module 10 is disposed between base 14 and handset 16 to couple modem 18 to base 14. Although a modem is illustrated in FIG. 1, it is understood that any device that is capable of connection directly to a telephone line can be coupled to module 10. As illustrated in FIG. 1, modem 18 is a computer external modem, and it should be understood that the modem may be a computer internal modem or a modem that is typically internal to a facsimile machine. Base 14 includes the traditional dialing and receiving hardware and is coupled by a two-wire line, line 20, to a telephone line directly or through a PBX controller. Base 14 also includes a modular telephone handset jack 22.

In the conventional configuration of telephone set 12, a handset cord 24 is coupled at one end to handset 16 which includes a microphone (not shown) and speaker (not shown). The other end of handset cord 24 is coupled to a modular telephone handset plug 26. In the conventional configuration of telephone set 12 for voice only communications, handset plug 26 is inserted into handset jack 22 for electrically connecting to corresponding pairs of microphone and speaker lines.

In the embodiment as illustrated in FIG. 1, module 10 includes a housing 28 and a series of user accessible selector switches, mode switch 30, phone type 32 and polarity switch 34 which permit manual selection of various modes and operational settings of the module. The functions of switches 30, 32 and 34 will be described later herein with reference to FIGS. 2 and 3. Mounted within housing 28 is circuitry (not shown) also discussed with reference to FIGS. 2 and 3. Mounted at one end of housing 28 is a modular telephone handset jack 36 for receiving handset plug 26. Extending outwardly from housing 28 is a four-wire interconnecting cable 38. Coupled at the end of cable 38 exterior to housing 28 is handset plug 40. Handset plug 40 is coupled within handset jack 22 in base 14 so as to electrically couple the telephone set microphone and speaker lines with module 10. Also mounted at housing 28 is a jack (not shown) adapted for receiving and electrically coupling a modular plug (not shown) coupled to an end of cable 42. Cable 42 is a two-wire interconnecting cable which connects the communications lines of modem 18 to module 10. Although module 10 is illustrated in FIG. 1, it is readily envisioned that the module circuitry may be incorporated with the computer or facsimile machine itself along with the modem. It is to be further understood that the telephone base may be of a cellular telephone type.

Figure 2:
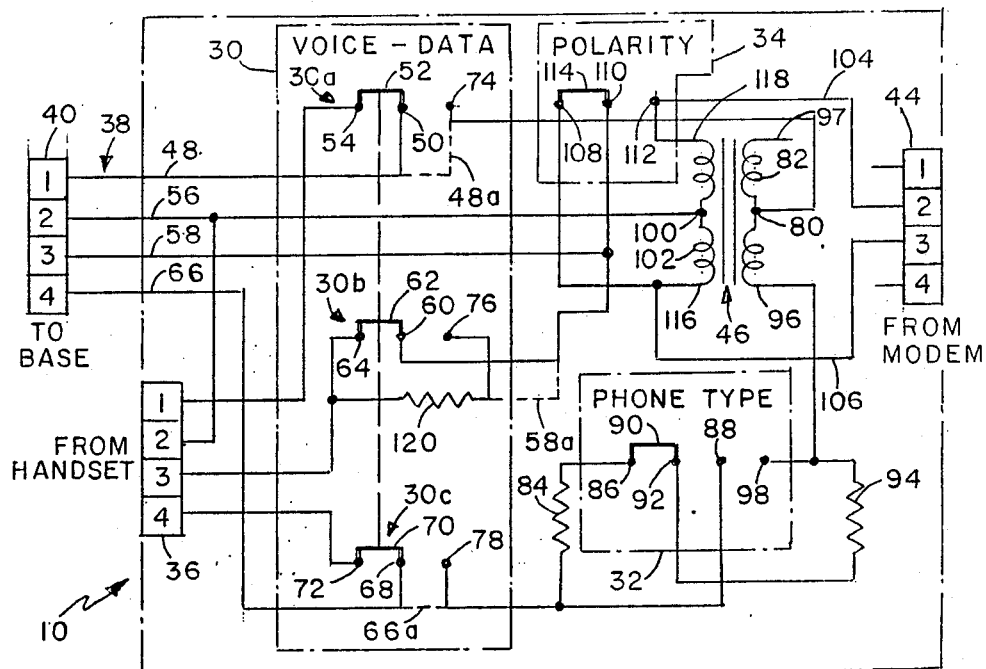
FIG. 2 is a schematic diagram of the module of FIG. 1.

FIG. 2 illustrates a schematical diagram of the circuitry of module 10 in an embodiment configured for coupling a telephone handset and modem to the telephone base as discussed with reference to FIG. 1. Module 10 is coupled by plug 40, a four-wire modular telephone handset plug, and cable 38 to handset jack 22 in base 14. Module 10 also includes a pair of jacks 36 and 44 which respectively receive handset plug 26 and a plug connected to cable 42 from modem 18. Plug 40 and jacks 36 and 44 are each configured with four separate contacts or pins to provide a four-wire connecting capacity. With both plug 40 and jack 36, all four pins are required, however, with jack 44 only the two center pins are used.

Module 10 further comprises a mode switch means, mode switch 30, for selecting between voice or data communications, i.e. modem or handset connection to the base. In the data mode, a signal level selector means, i.e. phone type switch 32, determines the voltage level of the signal coupled from the modem as output to the base. A polarity switch means, polarity switch 34, is used in the data mode for telephone handsets having carbon microphones so as to ensure proper interconnection with various telephone sets. A transformer 46 is included in module 10 as a two-wire-to-four-wire converter means. Transformer 46 converts the two-wire modem interconnection to the four-wire telephone handset connection while providing signal gain and signal isolation features. In summary, transformer 46 enables four-wire-to-two-wire conversion in a single component that provides both signal amplification and impedance transformation.

In FIG. 2, module 10 is illustrated with switch 30 in a voice position for voice communications. A modem connected at jack 44 is thus electrically bypassed by mode switch 30, a triple-pole, double-through slide switch, to permit voice only communication. In the voice mode, mode switch 30 couples corresponding base and handset microphone and speaker lines. In the voice mode, mode switch 30 electrically couples the base microphone lines connected at plug 40, pins 1 and 4, respectively to corresponding handset microphone lines connected at jack 36, pins 1 and 4. Similarly, mode switch 30 also electrically couples the base speaker lines connected at plug 40, pins 2 and 3, respectively to corresponding handset speaker lines connected to jack 36, pins 2 and 3. In particular, plug 40, pin 1 is coupled by microphone line 48 through one switch portion of mode switch 30, switch 30a, via contact 50, wiper 52 and contact 54, to jack 36, pin 1. Plug 40, pin 2 is coupled directly by speaker line 56 to jack 36, pin 2. Plug 40, pin 3 is coupled by speaker line 58 through another switch portion of mode switch 30, switch 30b, via contact 60, wiper 62 and contact 64, to jack 36, pin 3. Similarly, plug 40, pin 4 is coupled by microphone line 66 through switch 30c, via contact 68, wiper 70 and contact 72, to jack 36, pin 4.

When data communications are desired, module 10 is placed in the data mode by manually changing switch 30 to a data position. The wipers of mode switch 30 are ganged such that movement of the switch from one position to another results in changing of contacts in each of switches 30a, 30b and 30c. In the data mode, wiper 52 breaks continuity with contact 54 while connecting contact 50 with contact 74. Similarly, wiper 62 breaks continuity with contact 64 and connects contact 60 to contact 76. Furthermore, wiper 70 breaks continuity with contact 72 and connects contact 68 with contact 78.

With switch 30 in the data position, microphone line 48 is connected to tap 80 of secondary winding 82 of transformer 46. The other microphone line, line 66, is coupled directly or through a resistor to a pair of contacts of a single-pole, triple-throw slide switch, i.e. phone type switch 32. Specifically, line 66 is coupled through resistor 84 to contact 86 while also being coupled directly to contact 88. For digital telephone sets, switch 90 is positioned with wiper 90 electrically coupling contact 86 to contact 92. Contact 92 is electrically coupled through resistor 94 to end 96 of secondary winding 82. The position of wiper 90 in connecting contact 86 and 92 couples resistors 84 and 94 in series with the microphone line 66 so as to provide proper voltage levels.

For a telephone set using a handset having an Electrolet microphone, wiper 90 would be positioned between contacts 92 and 88. In this position only resistor 94 is in series with microphone line 66 and end 96 of secondary winding 82. For a telephone set using a handset having a carbon type microphone, wiper 90 is positioned between contacts 88 and 98. In this position, microphone line 66 is directly coupled to end 96 of secondary winding 82.

In the data mode, speaker line 56 is connected directly to center tap 100 of primary winding 102 of transformer 46. Speaker line 58 is coupled by a single-pole slide switch, polarity switch 34 to either modem communication line 104, which is coupled to pin 2 of jack 44, or modem communication line 106, which is coupled to pin 3 of jack 44. Polarity switch 34 is only required when module 10 is coupled to a telephone set having a handset that uses a carbon type microphone. Polarity switch 34 has a set of contacts 108, 110 and 112 and a wiper 114. Line 58 is coupled to contact 110, with contact 108 coupled to line 106 and end 116 of primary winding 102. The other end of primary winding 102, end 118, is coupled to contact 112 with contact 112 coupled to line 104. Line 58 is also coupled through mode switch 30B, via contact 60, wiper 62 and contact 76 and through a series coupled speaker deloading resistor 120 to jack 36, pin 3. It is further envisioned that polarity switch 34 may be positioned in the transformer secondary circuit. With polarity switch 34 positioned in the transformer secondary circuit, the output from phone type switch 32, and/or resistor 94, is coupled to either end 96 or end 97 of secondary winding 82.

When module 10 and modem are used with a telephone set having a carbon type microphone, phone type switch 32 is positioned with wiper 90 positioned between contacts 88 and 98. The phone type switch is used to determine the modem outgoing signal level which is ultimately determined by the type of microphone used by the telephone. In a telephone set using the carbon type microphone, the microphone and speaker lines have a direct connection. When the data mode is selected, polarity switch 34 is used to selectively couple speaker line 58 to either transformer ends 116 or 118. The user upon selecting the data mode listens for the dial tone in the handset speaker so as to select the correct polarity switch position. The user sets the polarity switch to a position in which the dial tone is the loudest.

In FIG. 2, several modifications may be made to the circuit to provide various additional features and functions to module 10. For example, in switch 30a, contacts 50 and 74 may be shorted at all times by line segment 48a. In this arrangement microphone line 48 is directly coupled to tap 80 of secondary winding 82. Furthermore, in switch 30c, contacts 68 and 78 are correspondingly shorted by line segment 66a. Line segment 66a couples microphone line 66 from plug 40, pin 4 directly to phone type switch 32 contact 88, and through resistor 84 to phone type switch 34 contact 86. With line segments 48a and 66a in place, a modem connected to module 10 at jack 44 is always coupled through transformer 46 to microphones lines 48 and 66. With the modem communication lines electrically coupled to microphone lines 48 and 66 via transformer 46, the computer may be used for computer autodialing in purposes. Furthermore, both voice and data communications may be selected by the operator without interruption of the autodialing feature.

There are presently commercially available computer software packages which enable one to create a computer data base of telephone numbers. The computer under software control operatively communicates with the modem to dial the operator selected number. When the module is selected for the data mode, data may be transmitted directly through microphone lines 48 and 66. When the module is selected for the voice mode, the computer and modem provide the autodial feature by direct coupling of the modem to lines 48 and 66. In the voice mode, the voice communications enabled by the coupling of the microphone and speaker lines as previously discussed.

Another optional feature of the present invention is the removal or bypassing of switch 30B. In this arrangement, speaker line 58 is coupled at all times by line segment 58a through handset speaker deloading resistor 120 to handset jack 36 pin 3. The resistance value of deloading resistor 120 is substantially reduced in this embodiment.

In the embodiment as illustrated in FIG. 2, transformer 46 is typically a 600:600 Ω or a 600:900 Ω transformer having tapped primary and secondary windings. The input impedance of a modem is typically 600 Ω, and using a transformer with a 600 Ω winding impedance matching is achieved. With a 600 Ω primary winding, the ends of the primary winding would be directly coupled to the modem circuit. Typically, the impedance of the handset speaker is in the range of 150-300 Ω s. It is, therefore, preferred that the impedance across one end of the primary to the center tap is approximately the same for coupling to the handset. The impedance of the primary winding from end to end is 600 Ω to match the impedance of the modem line. Resistors 84 and 94 are respectively 25K Ω and 5.6K Ω resistors while resistor 120 is typically a 1K Ω resistor. In the alternate embodiment where line 58 is directly coupled through line segment 58a to resistor 120, resistor 120 is typically a 150 Ω resistor. In either embodiment, deloading resistor 120 is utilized to reduce the handset speaker volume during data transmission or computer autodialing. Deloading resistor 120 serves to increase the incoming signal level to the modem.

Figure 3:
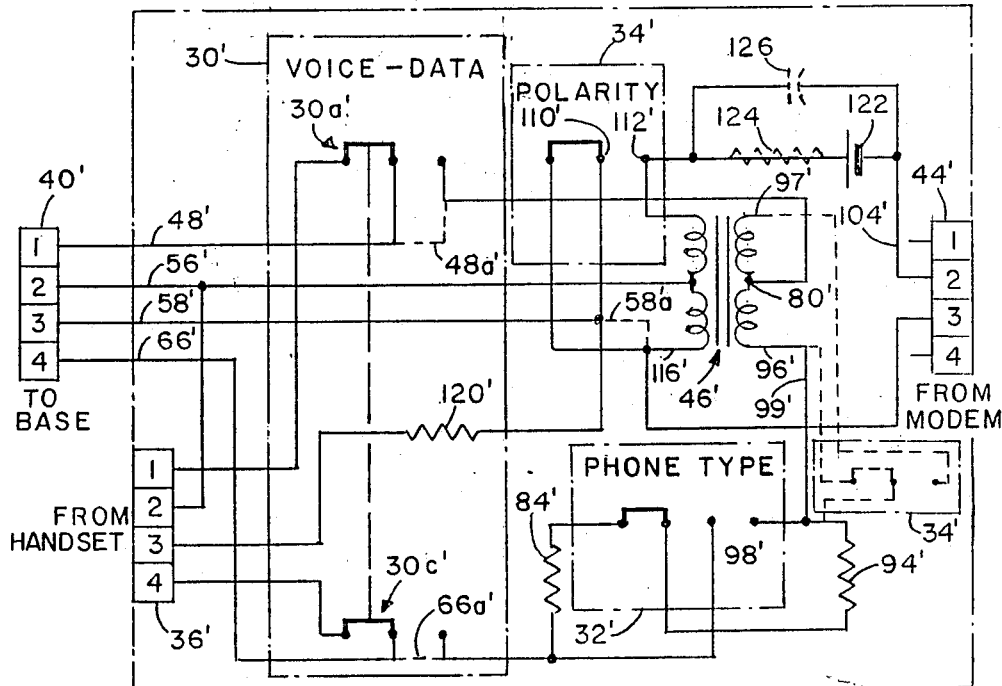
FIG. 3 is a schematic diagram of an alternate embodiment of the present invention adapted for coupling a facsimile machine modem and a telephone handset to the telephone base.

FIG. 3 illustrates yet another alternate embodiment of the present invention for use for coupling communications devices which require a voltage or current, such as certain types of facsimile machines to a telephone base at the handset jack. The embodiment illustrated in FIG. 3 is utilized in applications where the facsimile machine communications circuitry requires a loop current detection before communications operation can occur. The circuit of FIG. 2 is in essence modified to provide a battery 122 disposed in series between polarity switch contact 112′ and jack 44, pin 2 in line 104′. Battery 122 is typically a 3.0 volt battery. In certain facsimile machines, the current provided by battery 122 may be lowered to prolong battery life and yet provide sufficient current for communication purposes. In this case, a resistor 124 may be placed in series with battery 122. Upon the addition of resistor 124 into the circuit, capacitor 126 is placed in parallel across the series connection of battery 122 and resistor 124. Capacitor 126 provides a low impedance AC signal path thus enabling incoming signals to appear across the facsimile machine input circuit.

As further illustrated in FIG. 3, switch 30′ include only switches 30a′ and 30′c. Speaker line 58′ is coupled directly to base plug 40′, pin 3 to polarity switch contact 110′ and directly to handset jack 36′, pin 3 through resistor 120′. In this arrangement, switch 30′ may be configured as a double-pole double-throw switch. Furthermore, in implementing the autodialing feature, microphone line 48′ may be coupled directly to secondary tap 80′ of transformer 46′ via line segment 48a′. Similarly, microphone line 66′ may be coupled directly to phone type switch 32′, directly or indirectly through resistor 84′, via line segment 66a′. In this particular alternate embodiment, switch 30′ may be implemented as a double pole, single-throw switch.

FIG. 3 further illustrates the optional implementation of the polarity switch in the transformer secondary circuit. When optional polarity switch 34a′ is utilized, polarity switch 34′ is removed from the circuit with speaker line 58′ coupled to one or the other end of the primary winding of transformer 46. For example, speaker line 58′ is coupled by line segment 58a′ to primary winding end 116. In the transformer secondary circuit, line segment 99′, which couples secondary winding end 96′ to contact 98′ of phone type switch 32′ and an end of resistor, is removed. In place of line segment 99′ is polarity switch 34a′. Polarity switch 34a couples contact 98′ and the one end of resistor 94′ to a selected end, end 96′ or 97′ of the secondary winding.

Figure 4:
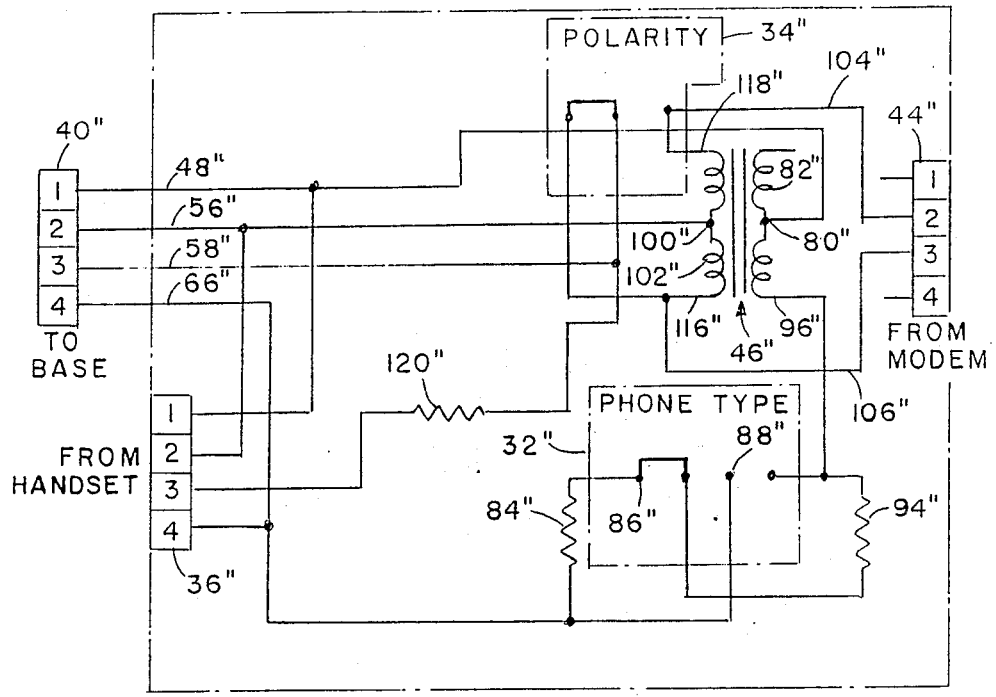
FIG. 4 is a schematical diagram of an alternate embodiment of the present invention adapted for computer modem autodialing.

FIG. 4 illustrates an embodiment of the present invention configured for computer modem autodialing. It is envisioned that a circuit disclosed with reference to FIG. 4 may be incorporated within the computer and/or modem hardware.

In FIG. 4, microphone line 48″ is coupled to plug 40″, pin 1, to secondary tap 80″ of transformer 46″. Microphone line 48″ is also coupled directly to jack 36″, pin 1. The other microphone line, line 66″, is coupled directly to jack 36″, pin 4, and indirectly to end 96″ of secondary winding 82″ by phone type switch 32, directly or through resistor 84″ and/or resistor 94″.

Speaker line 56″ is coupled from plug 40″, pin 2, to jack 36″, pin 2, and tap 100″ of primary winding 102″. The other speaker line, line 58″ is coupled at plug 40, pin 3, through polarity switch 34″ to a selected end of primary winding 102″, end 116″ or end 118″. Speaker line 58″ is also coupled through deloading resistor 120″ to jack 36″, pin 3. End 118 of primary winding 102″ is coupled by line 104″ to jack 44″, pin 2. Similarly, end 116″ is coupled by line 106″ to jack 44″, pin 3. Jack 44″, pins 2 and 3, are coupled to the modem.

The circuit configuration of FIG. 4 permits a minimal part count circuit for use with an autodialer or a computer modem for autodialing purposes. In the embodiment illustrated in FIG. 4, a modem connected to jack 44″, is always electrically coupled with microphone lines 48″ and 66″ through transformer 46″.

With reference to the transformer implementation as disclosed in FIGS. 2-4, the transformer is implemented to provide a four-wire-to-two-wire conversion circuit utilizing a single component. The transformer functions as an interface which provides autotransformation of voltage levels. In particular, the transformer provides amplification of a signal received on the base speaker lines through the primary winding to the communications lines. Furthermore, the transformer embodiment provides isolation between the microphone lines and the speaker lines, and impedance transformation between telephone handset, telephone base and modem.

Figure 5:
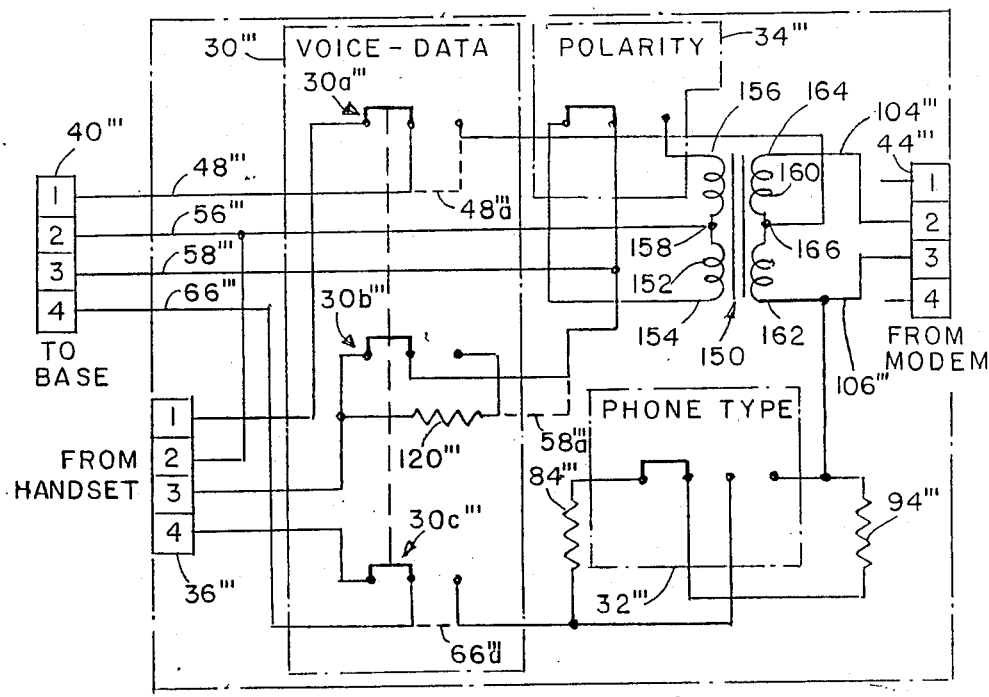
FIG. 5 is a schematical diagram of an alternate circuit embodiment of the invention of FIG. 1.

FIG. 5 illustrates a circuit embodiment similar to that of FIG. 2 incorporating an alternate transformer implementation. In FIG. 5, microphone line 48‴ is coupled to plug 40, pin 1‴, through switch 30a‴ to jack 36‴, pin 1, when switch 30‴ is selected for the voice mode. When switch 30‴ is selected for the data mode, line 48‴ is coupled through switch 30a‴ to tap 166 in secondary winding 160 of transformer 150. When the circuit is configured for the autodialing, line segment 48a‴ is used to directly couple microphone line 48 to tap 166.

The other microphone line, line 66‴, couples plug 40‴, pin 4, to switch 30‴. When switch 30‴ is selected for the voice mode, switch 30c‴ couples line 66‴ to jack 36‴, pin 4. When switch 30‴ is selected for the data mode, switch 30c‴ couples line 66‴ either to end 162 of secondary winding 160 phone type switch 32‴, directly or through resistor 84‴ and/or resistor 94‴. When the circuit is configured for the autodialing, line segment 66a‴ is used to couple line 66‴ either through resistor 84''', or directly, to phone type switch 32'''. The modem communication lines (not shown) are coupled to jack 44''', pins 2 and 3. Jack 44''', pins 2 and 3, are coupled respectively by lines 104''' and 106''' to ends 164 and 162 of secondary winding 160.

Speaker line 56''' is coupled to plug 40''', pin 2, directly to jack 36''', pin 2, and center tap 158 of primary winding 152 of transformer 150. The other speaker line, line 58''', is coupled to plug 40''', pin 3, through polarity switch 34''' to either end 154 or end 156 of primary winding 152. In addition, speaker line 58''' is coupled to switch 30b''' for direct coupling to jack 36''', pin 3, when mode switch 30''' is positioned in the voice mode. When mode switch 30''' is positioned for the data mode, speaker line 58''' is coupled by switch 30b''' through deloading resistor 120''' to jack 36''', pin 3. In the autodialing configuration, microphone line 58''' is coupled by line segment 58a''' through deloading resistor 120''' to jack 36, pin 3.

The configuration illustrated in FIG. 5 utilizes transformer 150 in a coupled transformation configuration. Transformer 150 provides a four-wire-to-two-wire conversion circuit in a single component. Transformer 150 also provides both signal amplification and impedance transformation. In the embodiment in FIG. 5, polarity switch 34 may be either in the primary winding circuit, as illustrated, or in the secondary winding circuit. Similarly, in the embodiment illustrated in FIGS. 2-4, the polarity switch may be also located in the secondary winding circuit.

Figure 6:
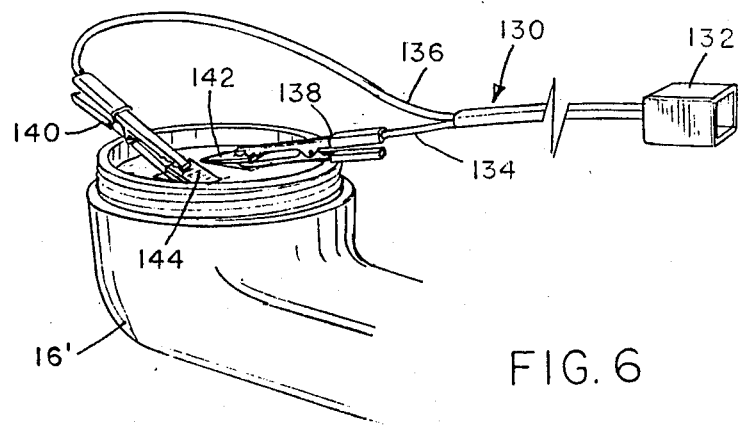
FIG. 6 is a perspective view of an attachment for coupling the module to a telephone set having a handset wired directly to the base.

In certain applications, the individual may not only find the telephone set hardwired directly to the telephone line or PBX system, but also the telephone handset hardwired directly to the base. FIG. 6 illustrates an accessory 130 for use in coupling through module 10 a modem or facsimile machine to the telephone line via the handset. Accessory 130 includes a modular jack 132 for receiving plug 40 (FIG. 2). Coupled to jack 32 are a pair of leads 134 and 136 which have respectively coupled, at an end opposite jack 132, clips 138 and 140. In using accessory 130, the mouthpiece and microphone (not shown), typically a carbon microphone, are removed from handset 16'. The mouthpiece portion of handset 16' includes microphone contacts 142 and 144 which in normal use of handset 16' connect the microphone to the handset microphone lines. Accessory 130 is coupled by clips 138 and 140 respectively to contacts 142 and 144. Plug 40 is then inserted into jack 132 so as to couple module 10 speaker lines 56 and 58 to the handset microphone lines.

The previous description of the preferred embodiments are provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein, but is to be accorded the widest scope consistent with the principles and novel features disclosed herein.

I claim:

1. An apparatus for connecting a telecommunication device having a connecting plug to a telephone line via a telephone set having a base and a handset connected to said base by a handset cord wherein said handset cord has at one end a handset plug and said base has a base jack for receiving said handset plug wherein said telephone base has a pair of base microphone lines and a pair of base speaker lines connected to said base jack and said handset has a pair of handset microphone lines and a pair of handset speaker lines connected to said handset plug, said apparatus for selectively electrically coupling at least one of said handset and said telecommunications device to said base wherein said telecommunications device has a pair of communications lines connected to said connecting plug, said apparatus comprising:

first plug means for mating and electrically coupling with said pair of base microphone lines and said pair of handset speaker lines at said base jack;

first jack means for receiving and electrically coupling with said pair of handset microphone lines and said pair of handset speaker lines at said handset plug;

second jack means for receiving and electrically coupling with said communications lines at said connecting plug;

switch means manually selectable between a first position and a second position for electrically coupling said first plug means with said first jack means when in a first position so as to couple each base microphone line with a corresponding handset microphone line and couple each base speaker line with a corresponding handset speaker line; and converter means electrically coupled to said switch means, said first plug means and said second jack means for, when said switch means is in said second position, electrically coupling said first plug means with said second jack means so as to directly couple each base microphone line with a corresponding communication line and electromagnetically couple each base speaker line with a corresponding communication line with said pair of base microphone lines and said pair of base speaker lines electrically isolated with respect to each other.

2. The apparatus of claim 1 further comprising signal level selector means coupled to said converter means for, when said switch means is in said second position, providing a selected resistance between said converter means and said first plug means.

3. The apparatus of claim 1 further comprising current source means coupled between said converter means and said second jack for providing a current to said second jack.

4. The apparatus of claim 1 wherein said converter means comprises a transformer having primary and secondary windings, each end of said primary winding connected to said second jack means for coupling with a respective one of said communications lines, said primary winding having a tap connected to said first jack for connecting to one of said handset speaker lines and connected to said first plug means for connecting to one of said base speaker lines, one end of said primary winding connected to said first plug means for connecting to the other one of said base speaker lines and said switch means, one end of said secondary winding connected to said switch means, and the other end of said secondary winding also connected to said switch means, said switch means connected to said first plug means for connection with said switch means one and an other one of said base microphone lines, and said switch means connected to said first jack means for connection with said switch means one and an other one of said handset microphone lines and another one of said handset speaker lines said switch means when in said first position for, coupling said first plug means to said first jack means to connect said one of said base microphone lines to said one of said handset microphone lines, said other one of said base speaker lines to said other one of said handset speaker lines, said other one of said base microphone lines to said other one of said handset microphone lines, and said switch means when in said second position for coupling said first plug means to said second jack means, to connect said secondary winding other end to said one of said base microphone lines, and said secondary winding one end to said other one of said base microphone lines.

5. The apparatus of claim 4 further comprising signal level selector means disposed between said switch means and said secondary winding one end for selectively electrically resistively coupling said first plug means connection of said other one of said base microphone lines to said secondary winding one end.

6. The apparatus of claim 4 further comprising polarity switch means coupled to said primary winding and said first plug means connection of said other one of said base speaker lines for coupling said first plug connection of said other one of said base speaker lines to a selected primary winding end.

7. The apparatus of claim 4 further comprising:
an additional secondary winding having one end coupled to said other end of said secondary winding; and
polarity switch means disposed between said switch means and said secondary winding for coupling said other one of said base microphone lines to a selected one of said secondary winding one end and said additional secondary winding other end.

8. The apparatus of claim 1 wherein said converter means comprises a transformer having primary and secondary windings, each end of said secondary winding connected to a respective one of said communications lines with one end of said secondary winding connected to said switch means and said secondary winding having a secondary winding tap connected to said switch means, said primary winding having a primary winding tap connected to one of said handset speaker lines and one of said base speaker lines, one end of said primary winding connected to the other one of said base speaker lines and said switch means, and said switch means when in said first position for, coupling one of said base microphone lines to one of said handset microphone lines, coupling said other one of said base speaker lines with the other one of said handset speaker lines, and coupling the other one of said base microphone lines with the other one of said handset microphone lines, and said switch means when in said second position for, coupling said one end of said secondary winding with said one of said base microphone lines, coupling said other one of said base speaker lines to said other one of said handset speaker lines, and coupling said secondary winding tap to said other one of said base microphone lines.

9. The apparatus of claim 8 further comprising signal level selector means disposed between said switch means and said secondary winding one end for selectively electrically resistively coupling said one of said base microphone lines to said secondary winding one end.

10. The apparatus of claim 8 further comprising polarity switch means coupled to said primary winding and said other one of said base speaker lines for coupling said other one of said base speaker lines and said switch means to a selected primary winding end.

11. The apparatus of claim 8 further comprising polarity switch means coupled to said secondary winding and said one of said base microphone lines for selectively coupling said one of said base microphone lines to a selected secondary winding end.

12. An apparatus for selectively coupling a telecommunications device having a pair of communication lines and a telephone handset having a pair of handset microphone lines and a pair of handset speaker lines to a telephone base at corresponding pairs of base microphone and speaker lines, said apparatus comprising:
mode switch means selectable between a voice position and a data position for, when in said voice position, electrically coupling said handset microphone and speaker lines with said respective base microphone and speaker lines;
converter means coupled to said switch means for electrically interfacing said communications lines with said base microphone and speaker lines, said mode switch means for when in said data position electrically coupling said communications lines, said base microphone lines and said base speaker lines to said converter means, said converter means for inductively coupling a first signal on said communications lines to said base microphone lines and for directly coupling a second signal on said base speaker lines to said communications lines, said converter means further for electrically isolating said base microphone lines from said base speaker lines.

13. The apparatus of claim 12 further comprising signal level selector means coupled to said converter means means for, when said mode switch means is in said data position, providing a selected resistance into one of said base microphone lines.

14. The apparatus of claim 12 further comprising current source means coupled to said converter means for providing a current to said communication lines.

15. The apparatus of claim 12 wherein said converter means comprises a transformer having first and second electromagnetically coupled windings, each end of said first winding connected to a respective one of said communications lines, said first winding having a tap connected to one of said handset speaker lines and one of said base speaker lines, one end of said first winding connected to the other one of said base speaker lines and said mode switch means, one end of said second winding connected to said mode switch means, and the other end of said second winding connected to said mode switch means, coupling one of said base microphone lines to one of said handset microphone lines, said mode switch means when in said voice position for, coupling said first winding one end to the other one of said handset speaker lines, coupling the other one of said base microphone lines to the other one of said handset microphone lines, and said switch means when in said second position for, coupling said second winding other end to said one of said base microphone lines, resistively coupling said first winding one end to said other one of said handset speaker lines, coupling said second winding one end to one the other one of said base microphone lines.

16. The apparatus of claim 13 wherein said converter means comprises a transformer having first and second electromagnetically coupled windings, each end of said first winding connected to a respective one of said communications lines, said first winding having a tap connected to one of said handset speaker lines and one of said base speaker lines, one end of said first winding connected to the other one of said base speaker lines and said mode switch means, one end of said second winding connected to said mode switch means, and the other end of said second winding connected to said mode switch means, coupling one of said base microphone lines to one of said handset microphone lines, said mode switch means when in said voice position for, coupling said first winding one end to the other one of said handset speaker lines, coupling the other one of said base microphone lines to the other one of said handset microphone lines, and said switch means when in said second position for, coupling said second winding other end to said one of said base microphone lines, resistively coupling said first winding one end to said other one of said handset speaker lines, coupling said second winding one end to one the other one of said base microphone lines.

17. The apparatus of claim 15 wherein said transformer second winding is tapped with said other one of said base microphone lines connected to said second winding tap.

18. The apparatus of claim 15 wherein said second winding one end is connected directly to said first plug for connection to said one of said base microphone lines and said second winding other end is connected directly to said other one of said base microphone lines.

19. The apparatus of claim 15 wherein said first winding one end is connected directly to said first jack for connection to said other one of said handset speaker lines.

20. The apparatus of claim 18 wherein a resistor is disposed between said first winding other end and said first jack connection of said other one of said handset speaker lines.

21. The apparatus of claim 12 wherein said converter means comprises a transformer having first and second electromagnetically coupled windings, each end of said second winding connected to a respective one of said communications lines with one end of said second winding connected to said mode with means and said second winding having a second winding tap connected to said mode switch means, said first winding having a first winding tap connected to one of said handset speaker lines and one of said base speaker lines, one end of said first winding connected to the other one of said base speaker lines and said switch means, and said mode switch means when in said voice position for, coupling one of said base microphone lines to one of said handset microphone lines, coupling said other one of said base speaker lines with the other one of said handset speaker lines, and coupling the other one of said base microphone lines with the other one of said handset microphone lines, and said mode switch means when in said data position for, coupling said one end of said second winding with said one of said base microphone lines, resistively coupling said other one of said base speaker lines to said other one of said handset speaker lines, and coupling said second winding tap to said other one of said base microphone lines.

22. The apparatus of claim 13 wherein said converter means comprises a transformer having first and second electromagnetically coupled windings, each end of said second winding connected to a respective one of said communications lines with one end of said second winding connected to said mode with means and said second winding having a second winding tap connected to said mode switch means, said first winding having a first winding tap connected to one of said handset speaker lines and one of said base speaker lines, one end of said first winding connected to the other one of said base speaker lines and said switch means, and said mode switch means when in said voice position for, coupling one of said base microphone lines to one of said handset microphone lines, coupling said other one of said base speaker lines with the other one of said handset speaker lines, and coupling the other one of said base microphone lines with the other one of said handset microphone lines, and said mode switch means when in said data position for, coupling said one end of said second winding with said one of said base microphone lines, resistively coupling said other one of said base speaker lines to said other one of said handset speaker lines, and coupling said second winding tap to said other one of said base microphone lines.

23. A circuit for coupling a telecommunications device having a pair of communication lines and a telephone handset having a pair of handset microphone lines and a pair of handset speaker lines to a telephone base at corresponding pairs of microphone and speaker lines, said circuit comprising:

first inductive means for, coupling to said pair of communications lines and said pair of base speaker lines, receiving a first signal upon said pair of base speaker lines, amplifying said first signal, and transmitting said amplified first signal upon said pair of communications lines;

second inductive means for coupling to said pair of base microphone lines, said second inductive means electromagnetically coupled to said first inductive means, said first and second inductive means electrically isolating said pair of base speaker lines from said pair of base microphone lines, said first inductive means further for receiving a second signal on said communications lines and for electromagnetically coupling said second signal to said second inductive means, and said second inductive means for receiving said electromagnetically coupled second signal from said first inductive means and for transmitting said received electromagnetically coupled second signal upon said base microphone lines.

24. The circuit of claim 23 further comprising signal level selector means coupled to said second inductive means for selectively establishing the signal level in said second signal.

25. A circuit for coupling a telecommunications device, having a pair of communication lines, to a two-wire telephone line via a telephone set having a telephone handset and a a telephone base coupled by a pair of microphone lines and a pair of speaker lines, said circuit comprising:

first and second inductive means electromagnetically coupled to one another, said first inductive means for coupling to said pair of speaker lines, for receiving a first signal upon said pair of speaker lines, and for electromagnetically coupling said first signal to said second inductive means, said second inductive means for, coupling to said pair of communications lines and said pair of microphone lines, receiving said electromagnetically coupled first signal, amplifying said electromagnetically coupled first signal, and transmitting said amplified first signal upon said pair of communications lines, and said second inductive means further for receiving a second signal on pair of said communications lines and coupling said second signal upon said pair of base microphone lines.

26. The circuit of claim 25 further comprising signal level selector means coupled to said second inductive means for selectively establishing the signal level in said second signal.

* * * * *